(12) United States Patent
Sorimachi et al.

(10) Patent No.: US 9,658,464 B2
(45) Date of Patent: May 23, 2017

(54) DIFFRACTIVE OPTICS ELEMENT, METHOD FOR MANUFACTURING DIFFRACTIVE OPTICS ELEMENT, AND ELECTRONIC DEVICE

(71) Applicant: Seiko Epson Corporation, Tokyo (JP)

(72) Inventors: Hidemitsu Sorimachi, Matsumoto (JP); Shigeo Nojima, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/281,119

(22) Filed: May 19, 2014

(65) Prior Publication Data

US 2014/0347732 A1    Nov. 27, 2014

(30) Foreign Application Priority Data

May 22, 2013    (JP) ................................. 2013-107728

(51) Int. Cl.
    *G02B 27/42*    (2006.01)
(52) U.S. Cl.
    CPC ..... *G02B 27/4233* (2013.01); *G02B 27/4222* (2013.01)
(58) Field of Classification Search
    CPC   G02B 27/42; G02B 27/0037; G02B 27/4205; G02B 5/18; G02B 27/0944; G02B 5/1895; G02B 27/4211; G02B 27/0927; G02B 27/1086; G02B 27/0075; G02B 5/1809; G02B 5/1814; G02B 5/1828; G02B 5/32; G02B 27/0905; G02B 27/4233
    See application file for complete search history.

(56) References Cited

U.S. PATENT DOCUMENTS

| | | | | |
|---|---|---|---|---|
| 4,372,649 | A * | 2/1983 | Kellie | G02B 5/203 359/359 |
| 5,427,893 | A * | 6/1995 | Koyama et al. | 430/270.11 |
| 6,721,485 | B1 | 4/2004 | Nakamura et al. | |
| 2001/0021002 | A1* | 9/2001 | Kodama | H04N 9/3105 353/30 |
| 2003/0077847 | A1* | 4/2003 | Yoo | 438/22 |
| 2007/0019909 | A1 | 1/2007 | Yamauchi et al. | |
| 2009/0009838 | A1* | 1/2009 | Masuda | G02B 26/127 359/204.1 |
| 2009/0297100 | A1 | 12/2009 | Yamauchi et al. | |
| 2011/0222160 | A1* | 9/2011 | Yamazaki | 359/589 |
| 2013/0113757 | A1* | 5/2013 | Tanaka et al. | 345/174 |
| 2014/0128542 | A1 | 5/2014 | Koike | |

FOREIGN PATENT DOCUMENTS

| | | |
|---|---|---|
| JP | 09-113901 A | 5/1997 |
| JP | 11-161142 A | 6/1999 |
| JP | 2007-058148 A | 3/2007 |
| JP | 2011-227951 A | 11/2011 |
| JP | 2011227951 A * | 11/2011 |
| WO | WO-01-11393 A | 2/2001 |
| WO | WO-2012-176716 A | 12/2012 |

* cited by examiner

*Primary Examiner* — Scott J Sugarman
*Assistant Examiner* — Sharrief Broome
(74) *Attorney, Agent, or Firm* — ALG Intellectual Property, LLC

(57) ABSTRACT

A diffractive optics element includes a substrate configured of a sapphire substrate and a diffractive optics structure, provided on the substrate, that forms an image when a laser beam is incident thereon. The diffractive optics structure has a diffractive optics portion, and the diffractive optics portion has a base material and a diffractive optics layer disposed on the base material. The thickness of the base material is no greater than 20 µm.

14 Claims, 5 Drawing Sheets

| IRRADIATION TIME<br>SILICONE THICKNESS | 10 HOURS | 24 HOURS | 100 HOURS |
|---|---|---|---|
| 100 μm | RT | RT+5°C | RT+20°C |
| 50 μm | RT | RT | RT+5°C |
| 20 μm | RT | RT | RT |
| 10 μm | RT | RT | RT |

RT: ROOM TEMPERATURE

DIFFRACTIVE OPTICS ELEMENT, METHOD FOR MANUFACTURING DIFFRACTIVE OPTICS ELEMENT, AND ELECTRONIC DEVICE

BACKGROUND

1. Technical Field

The present invention relates to diffractive optics elements having surface relief holograms, methods for manufacturing such diffractive optics elements, and electronic devices.

2. Related Art

The stated diffractive optics element is used, for example, as part of an illumination optical system in a projector. A hologram such as that disclosed in JP-A-11-161142, for example, which has a structure in which a hologram layer configured of a thermosetting resin or the like is provided upon a transparent substrate such as glass, can be given as an example of a diffractive optics element. Meanwhile, in recent years, laser light sources have begun to be used as light sources in projectors as well.

A surface relief-type computer generated hologram (CGH) can be given as an example of a diffractive optics element that can configure an illumination optical system in combination with the aforementioned laser light source. A surface-relief hologram that records only phase information is desirable as the hologram in an illumination optical system for a projector.

However, in the case where, for example, a thermosetting resin is used as the hologram layer, there is a problem in that because the resin has a low heat resistance temperature, a high-output laser beam for a high light flux projector being incident thereon will result in thermal deformation, discoloration, and so on, and as a result, the original performance can only be maintained for a short amount of time. There is a further problem in that it is necessary to ensure both a high level of transmissibility that can withstand even a high-output laser beam and a high level of heat resistance that can withstand heat generated when laser light is absorbed.

SUMMARY

An advantage of some aspects of the invention is to solve at least part of the aforementioned problems, and the aspects can be implemented as the following application.

First Aspect

A diffractive optics element according to this aspect of the invention includes a transparent substrate configured of an inorganic material, and a diffractive optics portion disposed on one surface of the transparent substrate and configured of a material that takes a siloxane bond as its skeleton, the diffractive optics portion having a base material and a diffractive optics layer, and the base material having a thickness of no greater than 20 μm in a direction perpendicular to the one surface of the transparent substrate.

According to this aspect of the invention, even in the case where the diffractive optics element is irradiated with a high-output (for example, approximately 40 W) laser beam, the base material, which is configured of a material that takes a siloxane bond as its skeleton (a silicone-based material, for example), is sufficiently thin at no greater than 20 μm, and thus can suppress the emission of heat caused by the diffractive optics portion absorbing the laser beam. In addition, there is a sufficiently short heat path from the diffractive optics portion to the transparent substrate, which is configured of an inorganic material having a higher thermal conductivity, and thus heat produced by the diffractive optics portion can be dissipated, making it possible to suppress a rise in the temperature of the diffractive optics element to a minimum. A diffractive optics element having a high reliability over a long lifespan can be provided as a result. In addition, by using a material that takes a siloxane bond as its skeleton, which is highly heat resistant, as the diffractive optics portion, the lifespan and reliability thereof can be improved as well.

Second Aspect

In the diffractive optics element according to the above aspect, it is preferable for the base material to be disposed between the diffractive optics layer and the transparent substrate and makes contact with the diffractive optics layer.

According to this aspect of the invention, the diffractive optics layer and the base material are disposed so as to make contact with each other; there is thus a sufficiently short heat path from the diffractive optics layer to the transparent substrate, which is configured of an inorganic material having a higher thermal conductivity, and thus heat produced by the diffractive optics layer can be dissipated, making it possible to suppress a rise in the temperature of the diffractive optics element to a minimum.

Third Aspect

In the diffractive optics element according to the above aspects, it is preferable for the one surface of the transparent substrate to have a first side and a second side that is a side opposite to the first side, and for the transparent substrate to have a portion between the first side and the second side where the diffractive optics portion is not disposed.

According to this aspect of the invention, the transparent substrate has a portion where the diffractive optics portion is not provided, and thus the front surface of the transparent substrate, which is configured of an inorganic material having a higher thermal conductivity than the material that takes a siloxane bond as its skeleton, can function as an emitting surface, making it possible to improve heat dissipation properties. Accordingly, a rise in temperature in the diffractive optics portion, which is configured of the material that takes a siloxane bond as its skeleton, can be suppressed to a minimum, making it possible to improve the reliability over a longer lifespan. Furthermore, a plurality of diffractive optics elements can be formed at once by forming the plurality of diffractive optics elements on a large substrate and dicing the substrate.

Fourth Aspect

In the diffractive optics element according to the above aspects, it is preferable for the transparent substrate to be a sapphire substrate.

According to this aspect of the invention, a sapphire substrate is used, and thus heat conducted from the material that takes a siloxane bond as its skeleton can be conducted and dissipated across a wider surface area, which makes it possible to realize high heat dissipation properties. Through this, a rise in the temperature of the diffractive optics portion, which is configured of the material that takes a siloxane bond as its skeleton, can be suppressed, which in turn makes it possible to provide a diffractive optics element having a high reliability over a longer lifespan.

Fifth Aspect

In the diffractive optics element according to the above aspects, it is preferable for a silane coupling agent layer to be provided between the transparent substrate and the diffractive optics portion.

According to this aspect of the invention, the transparent substrate and the diffractive optics portion are affixed to each other using the silane coupling agent layer, making it possible to strongly affix the transparent substrate and the diffractive optics portion to each other; this in turn makes it possible to suppress the material that takes a siloxane bond as its skeleton from expanding due to temperature changes.
Sixth Aspect A method for manufacturing a diffractive optics element according to this aspect of the invention includes forming a transparent resin configured of a material that takes a siloxane bond as its skeleton on one surface of a transparent substrate configured of an inorganic material, placing a surface of a transfer mold in which is formed a relief structure and the one surface of the transparent substrate opposite to each other with the transparent resin positioned therebetween, pressing the transparent resin between the transparent substrate and the transfer mold so that the thickness of a base material that configures a diffractive optics portion becomes no greater than 20 µm, and separating the transparent substrate and the transfer mold from each other.

According to this aspect of the invention, even in the case where the diffractive optics element is irradiated with a high-output (for example, approximately 40 W) laser beam, the base material, which is configured of a material that takes a siloxane bond as its skeleton (a silicone-based material, for example), is formed sufficiently thin at no greater than 20 µm, and thus can suppress the emission of heat caused by the diffractive optics portion absorbing the laser beam. In addition, there is a sufficiently short heat path from the diffractive optics portion to the transparent substrate, which is configured of an inorganic material having a higher thermal conductivity, and thus heat produced by the diffractive optics portion can be dissipated, making it possible to suppress a rise in the temperature of the diffractive optics element to a minimum. A diffractive optics element having a high reliability over a long lifespan can be formed as a result. In addition, by using a material that takes a siloxane bond as its skeleton, which is highly heat resistant, as the diffractive optics portion, the lifespan and reliability thereof can be improved as well.
Seventh Aspect An electronic device according to this aspect of the invention includes the diffractive optics element according to the above aspects.

According to this aspect of the invention, the electronic device includes the aforementioned diffractive optics element, and it is thus possible to provide an electronic device having increased heat resistance, improved display quality, and so on.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, specific embodiments of the invention will be described based on the drawings. Note that the drawings used here illustrate the areas being described in an enlarged or reduced manner so that those areas can be recognized properly.

Note also that in the following embodiments, the phrase "upon a substrate" can refer, for example, to a constituent element being disposed directly on top of the substrate, a constituent element being disposed on top of the substrate with another constituent element provided therebetween, or part of the constituent element being disposed directly on top of the substrate while another part is disposed on top of the substrate with another constituent element provided therebetween.

First Embodiment

Configuration of Projector Serving as Electronic Device

Figure 1:
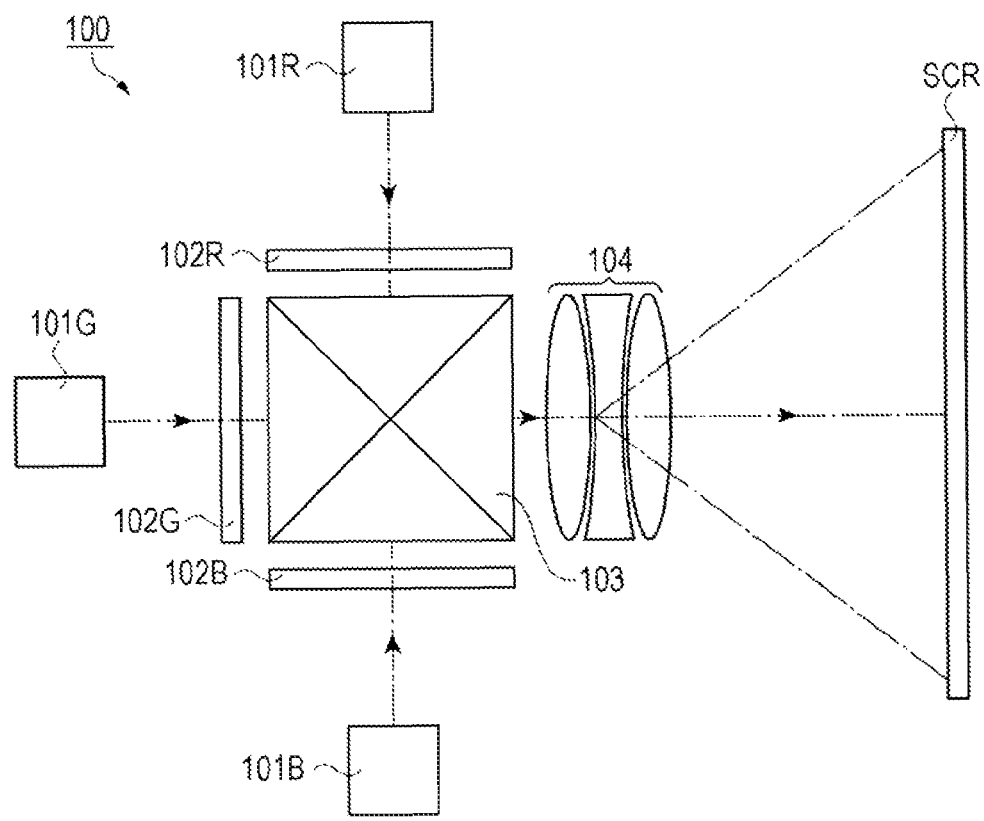
FIG. 1 is a schematic diagram illustrating the configuration of a projector that serves as an electronic device and includes a diffractive optics element.

FIG. 1 is a schematic diagram illustrating the configuration of a projector that serves as an electronic device and includes a diffractive optics element. The configuration of the projector will be described hereinafter with reference to FIG. 1.

As shown in FIG. 1, a projector 100 is a projection-type image display apparatus that displays color pictures (images) on a screen (projection surface) SCR. The projector 100 uses three liquid-crystal light valves (liquid crystal panels), one for each of red light RL, green light GL, and blue light BL, as optical modulating elements. Furthermore, the projector 100 uses a semiconductor laser (laser light source), from which high-luminosity and high-output light can be obtained, as a light source in illumination units.

Specifically, the projector 100 includes illumination units 101 (101R, 101G, and 101B), optical modulation elements 102 (102R, 102G, and 102B), a synthesizing optical system 103, and a projection optical system 104. Note that the diffractive optics element is disposed between the illumination units 101 and the optical modulation elements 102. The diffractive optics element will be described later.

The illumination units 101 include a first illumination unit 101R that emits the red light RL, a second illumination unit 101G that emits the green light GL, and a third illumination unit 101B that emits the blue light BL.

The optical modulation elements 102 include an optical modulation element 102R on which the red light RL is incident, an optical modulation element 102G on which the green light GL is incident, and an optical modulation element 102B on which the blue light BL is incident.

The red light RL, the green light GL, and the blue light BL that have been modulated by the optical modulation element 102R, the optical modulation element 102G, and the optical modulation element 102B, respectively, are incident on the synthesizing optical system 103. Light (image light) WL synthesized by the synthesizing optical system 103 is incident on the projection optical system 104.

The first illumination unit 101R, the second illumination unit 101G, and the third illumination unit 101B have the same basic configuration, aside from employing semiconductor lasers (laser light sources) that emit laser beams corresponding to the red light RL, the green light GL, and the blue light BL, respectively, as their light sources. The illumination units 101R, 101G, and 101B adjust the respective color lights RL, GL, and BL to uniform intensity distributions, and then emit the respective color lights (illumination lights) RL, GL, and BL toward the optical modulation elements 102R, 102G, and 102B that correspond to the respective color lights RL, GL, and BL.

The optical modulation element 102R, the optical modulation element 102G, and the optical modulation element 102B use transmissive liquid crystal panels, for example, as optical modulating elements. The respective optical modulation elements 102R, 102G, and 102B then form the image light, resulting from modulating the color lights RL, GL, and BL, in accordance with image information corresponding to the respective color lights RL, GL, and BL. Note that a pair of polarizing plates (not shown) are disposed on a light-entry side and a light-exit side of the liquid crystal panels, allowing only linearly-polarized beams of a specified directionality to pass through.

The synthesizing optical system 103, which is configured of a cross dichroic prism, synthesizes the image light corresponding to the color lights RL, GL, and BL emitted from the corresponding optical modulation elements 102R, 102G, and 102B, and emits the resulting image light WL toward the projection optical system 104.

The projection optical system 104 is configured of a projection lens group, and enlarges and projects the image light WL synthesized by the synthesizing optical system 103 toward the screen SCR. Through this, an enlarged color picture (image) is displayed on the screen SCR.

Configuration of Illumination Unit

Figure 2:
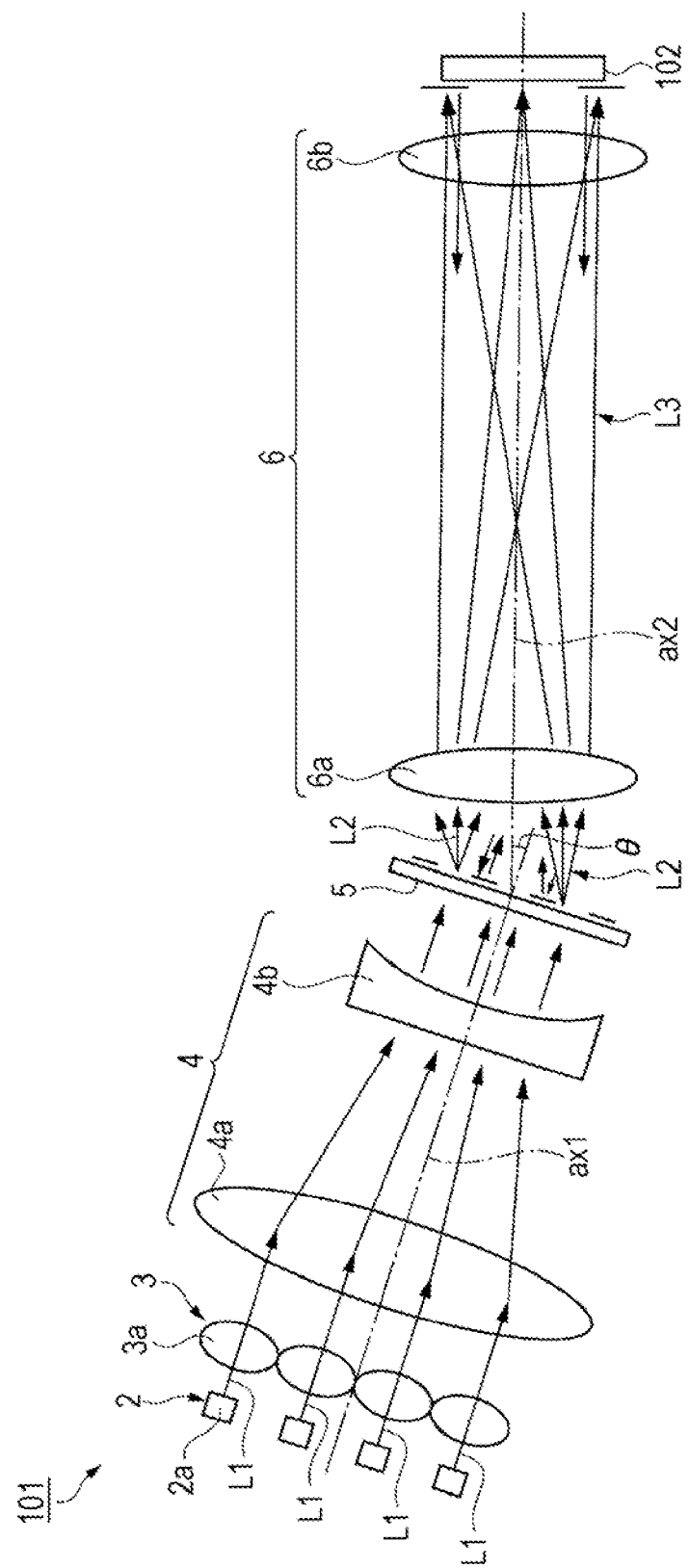
FIG. 2 is a schematic diagram illustrating the configuration of an illumination unit serving as a part of a projector.

FIG. 2 is a schematic diagram illustrating the configuration of the illumination units that serve as parts of the projector. The configuration of the illumination units will be described hereinafter with reference to FIG. 2.

As shown in FIG. 2 and described earlier, the illumination units 101R, 101G, and 101B have the same basic configuration aside from employing different semiconductor lasers (laser light sources) that correspond to the color lights RL, GL, and BL, respectively.

Accordingly, the following descriptions assume that the first illumination unit 101R, the second illumination unit 101G, and the third illumination unit 101B are the same as the illumination unit 101 shown in FIG. 2. Likewise, the optical modulation element 102R, the optical modulation element 102G, and the optical modulation element 102B are assumed to be the same as the optical modulation element 102 shown in FIG. 2. FIG. 2 is a schematic diagram illustrating the general configuration of the illumination unit 101.

As shown in FIG. 2, the illumination unit 101 includes an array light source 2 in which a plurality of semiconductor lasers 2a are arranged, a collimator optical system 3 on which beams L1 emitted from the semiconductor lasers 2a are incident, an afocal optical system 4 on which the beams L1 that have been converted into parallel light by the collimator optical system 3 is incident, a diffractive optics element 5 on which the beams L1 whose size (spot diameter) has been adjusted by the afocal optical system 4 is incident, and a compounding optical system 6 on which light (diffracted light) L2 diffracted by the diffractive optics element 5 is incident. Light emitted from the compounding optical system 6 serves as illumination light that illuminates the corresponding optical modulation element 102.

The array light source 2 is configured by arranging the plurality of semiconductor lasers 2a in an array in a plane that is orthogonal to an optical axis ax1 of the afocal optical system 4. The laser beams L1 emitted from the semiconductor lasers 2a are coherent linearly-polarized beams, and are emitted so as to be parallel to each other.

The collimator optical system 3 is configured of a plurality of collimator lenses 3a arranged in an array so as to correspond to the respective semiconductor lasers 2a. The laser beams L1 converted into parallel light by the respective collimator lenses 3a are incident on the afocal optical system 4.

The afocal optical system 4 is configured of a lens 4a and a lens 4b. The beams L1 whose size (spot diameter) has been adjusted by the afocal optical system 4 are incident on the diffractive optics element 5.

The diffractive optics element 5 is configured of a computer generated hologram (CGH). The diffractive optics element 5 is designed to maximize the diffraction efficiency of first-order diffracted light.

Although the first-order diffracted light includes +first-order diffracted light and −first-order diffracted light, the diffractive optics element 5 is designed to maximize the diffraction efficiency of one of these types of first-order diffracted light. Employing CGH makes it possible to achieve a diffraction efficiency of greater than or equal to 90% for the first-order diffracted light (and ideally, 100%).

Here, the plurality of laser beams L1 emitted from the respective semiconductor lasers 2a in the array light source 2 are incident on the diffractive optics element 5. Accordingly, a plurality of first-order diffracted light beams, corresponding to the number of the plurality of laser beams L1, are emitted from the diffractive optics element 5. FIG. 2 shows two such first-order diffracted light beams. The primary light rays of the respective first-order diffracted light beams are parallel to each other. Accordingly, in the invention, unless otherwise specified, a flux corresponding to the plurality of first-order diffracted light beams will be treated as a single instance of the diffracted light L2. A direction of the primary light ray in the center of the diffracted light L2 is a direction that passes through the center of the flux corresponding to the plurality of first-order diffracted light beams and that is parallel to the primary light rays of the respective first-order diffracted light beams.

The diffractive optics element 5 produces a diffracted light distribution so that a luminous intensity distribution has an overall rectangular shape and so that an aspect ratio of the luminous intensity distribution matches an aspect ratio of an illumination target (an image forming region of the optical modulation element 102). As a result, illumination light having an overall rectangular shape can be emitted efficiently to the rectangular image forming region of the optical modulation element 102.

Meanwhile, it is preferable for the beams L1 to be incident on the diffractive optics element 5 perpendicularly. This makes it easy to design the CGH diffractive optics for obtaining the stated diffracted light L2. On the other hand, the direction of the primary light ray in the center of the diffracted light L2 is tilted relative to the optical axis ax1.

The compounding optical system 6 is configured of two lenses, namely a compound lens 6a and a field lens 6b. The compounding optical system 6 is disposed so that an optical axis ax2 thereof matches the direction of the primary light ray in the center of the diffracted light L2. This makes it possible to emit illumination light having a more uniform intensity distribution while at the same time reducing aberration caused by the compounding optical system 6.

Meanwhile, it is preferable for the direction of the primary light ray in the center of the diffracted light L2 to be tilted relative to the optical axis ax1 by an angle θ, which is 5 to 20°. Note that the angle θ is indicated in FIG. 2 as an acute angle formed between the optical axis ax2 and the optical axis ax1. As a result, of the diffracted light L2 emitted from the diffractive optics element 5, first-order diffracted light beams having a maximum diffraction efficiency can be efficiently caused to be incident on the compounding optical system 6.

The compounding optical system 6 compounds the plurality of first-order diffracted light beams from the diffractive optics element 5 on the optical modulation element 102.

Configuration of Diffractive Optics Element

Figure 3A:
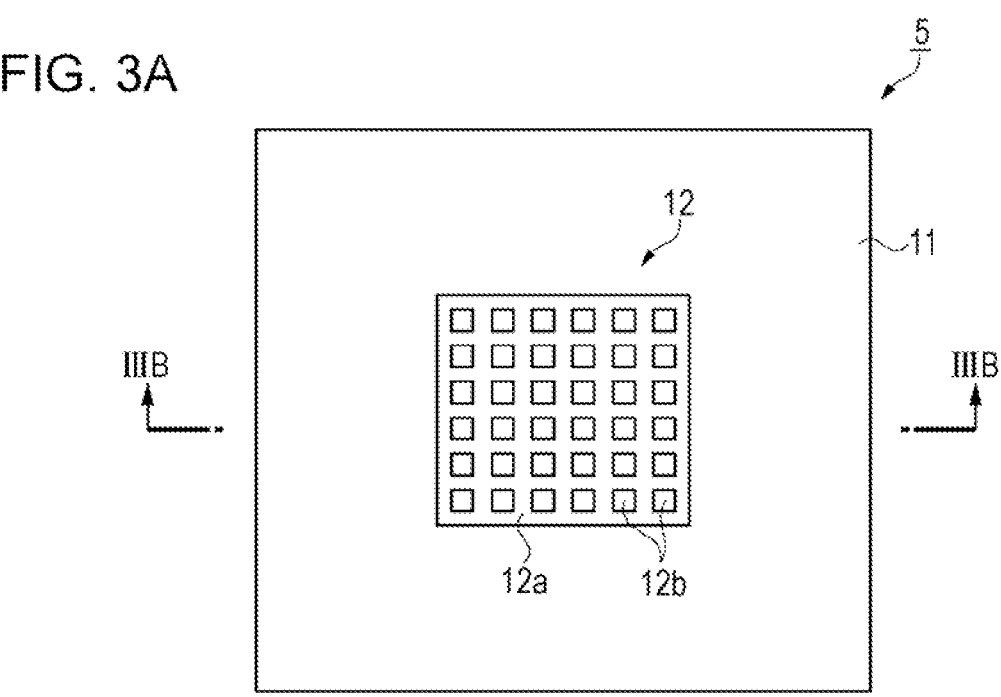
FIG. 3A is a schematic plan view illustrating the configuration of a diffractive optics element serving as a part of an illumination optical system.
Figure 3B:
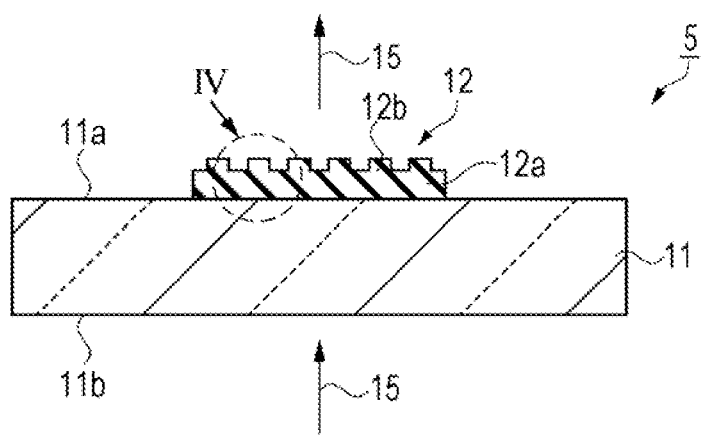
FIG. 3B is a schematic cross-sectional view of the diffractive optics element taken along a IIIB-IIIB line in FIG. 3A.
Figure 4:
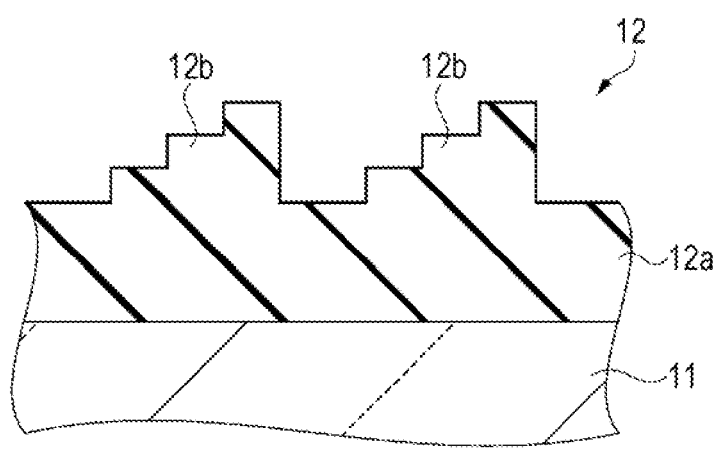
FIG. 4 is a cross-sectional view of an area IV of the diffractive optics element shown in FIG. 3B, in an enlarged manner.

FIGS. 3A and 3B are schematic views illustrating the configuration of the diffractive optics element serving as a part of the illumination optical system. FIG. 3A is a schematic plan view. FIG. 3B is a schematic cross-sectional view of the diffractive optics element shown in FIG. 3A, taken along a IIIB-IIIB line. FIG. 4 is a cross-sectional view of an area IV of the diffractive optics element shown in FIG. 3B, in an enlarged manner. The structure of the diffractive optics element will be described hereinafter with reference to FIGS. 3A to 4.

As shown in FIGS. 3A and 3B, the diffractive optics element 5 includes a substrate 11, which is a transparent substrate, and a diffractive optics portion 12 disposed upon the substrate 11. It is preferable to use a material that does not easily absorb a laser beam 15 with a certain wavelength, an inorganic material having high thermal conductivity, or the like for the substrate 11, such as sapphire glass (a sapphire substrate). Note that the substrate is not limited to sapphire glass, and quartz, crystal, or the like may be employed as well.

The diffractive optics portion 12 is configured of a material having a siloxane bond as its skeleton (for example, a silicone material, silicone rubber, or silicone resin), and includes a base material 12a and a diffractive optics layer 12b. It is preferable for a material that absorbs little of the laser beam 15 with the wavelength (approximately 400 nm, for example) and that does not easily give off heat to be employed as the type of the silicone resin.

The substrate 11 is, for example, 20 mm in the horizontal direction and 20 mm in the vertical direction when viewed from above. The substrate 11 is 0.7 mm thick, for example. An antireflective film (not shown) is formed on a side of the substrate 11 on which the diffractive optics portion 12 is not disposed (that is, on a rear surface 11b).

Meanwhile, the diffractive optics portion 12 shown in FIGS. 3B and 4 is, for example, 5 mm in the horizontal direction and 5 mm in the vertical direction. The diffractive optics layer 12b, in which a surface relief-type (surface relief structure) diffractive optics structure is formed, is provided in a surface of the base material 12a of the diffractive optics portion 12. The diffractive optics structure is formed in a stepped shape, having four steps, for example. The thickness of the base material 12a is, for example, no greater than 10 μm. The thickness of the diffractive optics layer 12b is, for example, 1 μm.

The front surface 11a of the substrate 11, which is configured of a sapphire substrate having a higher thermal conductivity than silicone rubber, is exposed, and as such can function as an emitting surface, making it possible to improve heat dissipation properties. Accordingly, a rise in temperature in the diffractive optics portion 12, which is configured of silicone rubber, can be suppressed to a minimum, making it possible to improve the reliability over a longer lifespan.

The laser beam 15 is incident on the rear surface 11b of the diffractive optics element 5, for example. Note that the configuration may be such that the laser beam 15 is incident on the front surface 11a instead.

Method for Manufacturing Diffractive Optics Element

FIGS. 5A to 5D are schematic cross-sectional views illustrating an order of steps in a method for manufacturing the diffractive optics element. The method for manufacturing the diffractive optics element will be described hereinafter with reference to FIGS. 5A to 5D.

Figure 5A:
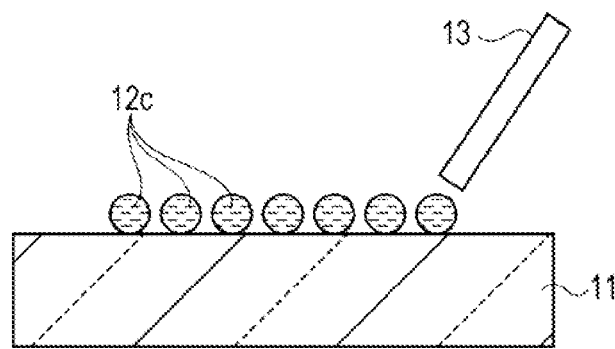
FIGS. 5A to 5D are schematic cross-sectional views illustrating an order of steps in a method for manufacturing a diffractive optics element.

In the step shown in FIG. 5A, liquid silicone rubber 12c, which is a material that will serve as the diffractive optics portion 12, is supplied upon the substrate 11. Specifically, the substrate 11 is 20 mm in the vertical and horizontal directions and 0.7 mm thick, as described earlier. A polishing process is carried out on the front surface 11a and the rear surface 11b of the substrate 11. An antireflective film configured of a dielectric multilayer film is formed on the rear surface 11b of the substrate 11.

Next, in a normal temperature environment, the liquid silicone rubber 12c (a transparent resin) is applied to the surface of the substrate 11 using a syringe 13, for example. The amount of the liquid silicone rubber 12c that is applied is 0.3 g, for example. Note that it is preferable for the silicone rubber 12c applied upon the substrate 11 to be disposed essentially uniformly across the entire region of the diffractive optics layer 12b, as a plurality of bead shapes.

The liquid silicone rubber 12c according to this embodiment is a two-liquid mixing polymer-type thermosetting resin; a base compound and a curing agent are mixed and agitated prior to filling the syringe 13, and the resulting compound is placed in a mold and thermally cured in a 150° C. environment for two hours, hardening into a shape in which the shape formed in the mold is transferred directly as a result.

Figure 5B:
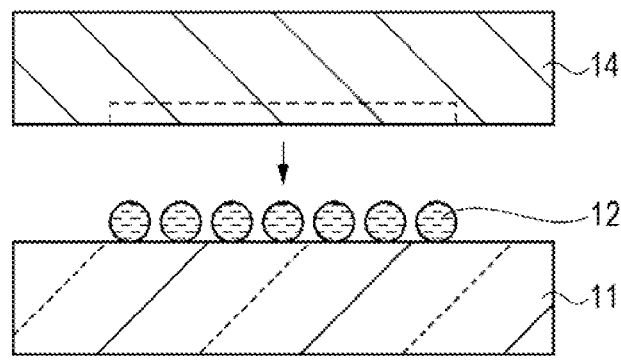

In the step shown in FIG. 5B, a transfer mold 14 for forming the diffractive optics portion 12 is disposed upon the substrate 11. Specifically, first, the substrate 11 onto which the plurality of silicone rubbers 12c have been applied is covered by the transfer mold 14, which is configured of nickel, for example. A depression approximately 5 mm in the vertical and horizontal directions is formed in the approximate center of the transfer mold 14. The shapes of the diffractive optics structure are formed in the depression.

Figure 5C:
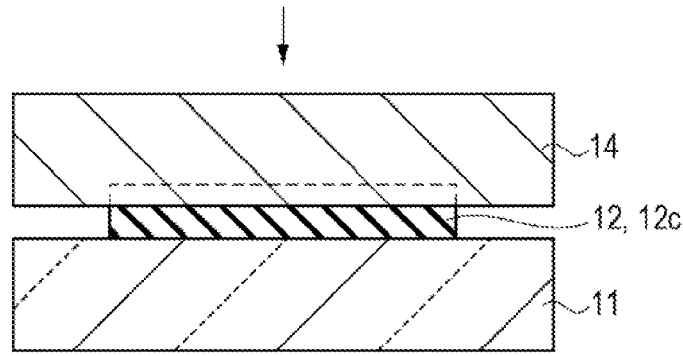

In the step shown in FIG. 5C, the transfer mold 14 is pressed onto the substrate 11. The pressure of the transfer mold 14 causes the liquid silicone rubber 12c to fill a space between the substrate 11 and the transfer mold 14.

At this time, the height of the transfer mold 14 is adjusted so that the thickness of the base material 12a of the diffractive optics portion 12 reaches approximately 10 μm. The transfer mold 14 is then left pressed onto the substrate 11 in a 150° C. environment for two hours. This cures the liquid silicone rubber 12c.

Although the silicone rubber 12c experiences a slight reduction in volume during the polymerization and curing process, the uncured liquid silicone rubber 12c has an effect of filling gaps resulting from the reduction in volume, and thus the structure of the diffractive optics element 5 created through the method for manufacturing the diffractive optics element 5 according to this embodiment can be molded at a higher transfer efficiency than when forming the same structure through injection molding using a thermosetting resin.

Figure 5D:
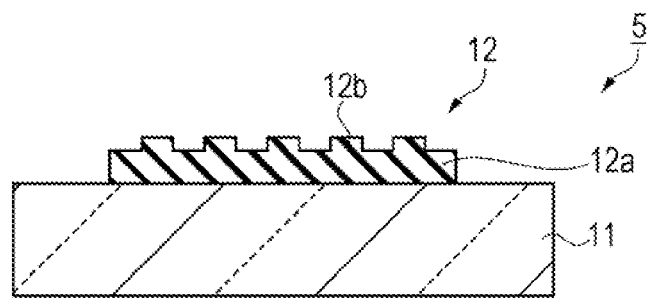

In the step shown in FIG. 5D, the transfer mold 14 is separated from the substrate 11. Specifically, the transfer mold 14 is separated from the substrate 11 after the silicone rubber 12c has been thermally cured. The diffractive optics portion 12 is formed upon the substrate 11 as a result.

By forming the diffractive optics portion 12 in this manner, it is easy to ensure the base material 12a of the diffractive optics portion 12 is no thicker than 10 μm; furthermore, a rise in the temperature of the diffractive optics portion 12 can be suppressed to a minimum, making it possible to realize a diffractive optics element 5 having a high reliability over a long lifespan.

Figures 6, 7:
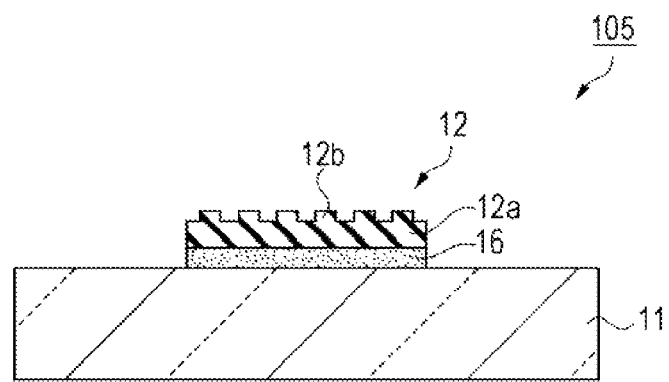
FIG. 6 is a chart illustrating temperature changes occurring when the thickness of a diffractive optics portion (base material) and a laser beam irradiation time are varied.
FIG. 7 is a schematic cross-sectional view illustrating the structure of a diffractive optics element according to a variation.

FIG. 6 is a chart illustrating temperature changes occurring when the thickness of the diffractive optics portion (base material) configured of silicone and a laser beam irradiation time are varied. Hereinafter, temperature changes occurring when the thickness of the diffractive optics portion and the laser beam are varied will be described with reference to FIG. 6.

The vertical direction in the chart shown in FIG. 6 indicates values of the thickness of the diffractive optics portion 12 (the base material) varied in four stages, namely 10 μm, 20 μm, 50 μm, and 100 μm. The horizontal direction in the chart indicates values of irradiation times for the laser beam 15 varied in three stages, namely 10 hours, 24 hours, and 100 hours. The chart indicates changes in the temperature of the diffractive optics portion 12 relative to room temperature (RT) when the aforementioned variations are carried out.

The laser beam 15 is a Gaussian beam at a wavelength of 488 nm (blue light), an output of 60 W/cm$^2$, and a beam diameter of 1 mm. The substrate 11 is sapphire glass, whereas the diffractive optics portion 12 (the base material) is silicone rubber, as described above. Note that experiments were carried out using only the base material 12a as a sample of the diffractive optics portion 12, without providing the diffractive optics layer 12b.

The temperature reached on the surface of the silicone rubber when the laser beam 15 was incident thereon was measured. The temperature reached on the surface was obtained by an infrared light camera following changes in the temperature of the silicone rubber over time when the laser beam 15 was incident thereon for predetermined amounts of time (10 hours, 24 hours, and 100 hours).

It can be seen from the chart that when silicone rubber that is 100 μm thick was irradiated with the laser beam 15 for 100 hours, the temperature thereof rose 20° C. beyond room temperature (RT). Meanwhile, when silicone rubber that is 50 μm thick was irradiated with the laser beam 15 for 100 hours, the temperature thereof rose 5° C. beyond room temperature. On the other hand, no rise in temperature was observed when silicone rubber that is 20 μm or 10 μm thick was irradiated with the laser beam 15.

Accordingly, it can be seen that the surface temperature of silicone rubber will not change the thinner the silicone rubber is. This effect is thought to be caused by a phenomenon in which the thinner the silicone rubber is, the easier it is for heat produced by minute amounts of the laser beam 15 being absorbed into the silicone rubber to be transferred to the sapphire glass, and thus the heat can be dispersed over a wide surface area of the sapphire glass and dissipated to the exterior.

Based on the foregoing, it is preferable for the thickness of the diffractive optics portion 12 configured of silicone rubber to be no greater than 20 μm, which is the thickness at which the effects of a linear expansion coefficient begin to appear. It is further preferable for the thickness to be no greater than 10 μm.

The following effects can be obtained by the diffractive optics element 5, the method for manufacturing the diffractive optics element 5, and the electronic device according to the embodiment described in detail thus far.

1. According to the diffractive optics element 5 and the method for manufacturing the diffractive optics element 5 according to this embodiment, even in the case where the diffractive optics element 5 is irradiated with a high-output (for example, approximately 40 W) laser beam 15, the base material 12a, which is configured of silicone rubber, is sufficiently thin at no more than 10 μm, and thus can suppress the emission of heat caused by the diffractive optics portion 12 absorbing the laser beam 15. In addition, there is a sufficiently short heat path from the diffractive optics portion 12 to the substrate 11, which is configured of a sapphire substrate having a higher thermal conductivity, and thus by also conducting and dissipating heat produced by the diffractive optics portion 12, a rise in the temperature of the diffractive optics element 5 can be suppressed to a minimum. The diffractive optics element 5 having a high reliability over a long lifespan can be provided as a result. In addition, by using silicone rubber, which is highly heat resistant, as the diffractive optics portion 12, the lifespan and reliability thereof can be improved as well.

2. According to the electronic device according to this embodiment, the electronic device includes the aforementioned diffractive optics element 5, and it is thus possible to provide an electronic device having increased heat resistance, improved display quality, and so on.

Note that the aspects of the invention are not intended to be limited to the aforementioned embodiments; many suitable changes can be made thereto without departing from the essence or spirit of the invention as set forth in the scope of aspects and the specification as a whole, and are intended to be included in the technical scope of the aspects of the invention. Variations such as those described hereinafter can also be carried out.

First Variation

The invention is not limited to providing the diffractive optics portion 12 directly upon the substrate 11 with nothing provided therebetween as described above, and a configuration such as that illustrated in FIG. 7 may be employed. FIG. 7 is a schematic cross-sectional view illustrating the structure of a diffractive optics element 105 according to a first variation.

In the diffractive optics element 105 illustrated in FIG. 7, the substrate 11 and the diffractive optics portion 12 are affixed to each other via a silane coupling agent 16. According to this configuration, the substrate 11 and the diffractive optics portion 12 are affixed to each other using the silane coupling agent 16, making it possible to strongly affix the silicone rubber to the sapphire substrate; this in turn makes it possible to suppress the silicone rubber from expanding due to temperature changes.

This configuration also makes it possible to reduce skew due to the linear expansion between the substrate 11 and the diffractive optics portion 12. Furthermore, despite the base material 12a configured of silicone rubber being no more than 10 μm thick, movement in the horizontal direction can be suppressed, which in turn makes it possible to suppress the pitch of the diffractive optics layer 12b from shifting. In other words, the diffractive optics portion 12 can be made stable while also being made thin.

Second Variation

The invention is not limited to a configuration in which the diffractive optics portion 12 is provided so that the front surface 11a of the substrate 11 is exposed, and the diffractive optics portion 12 may instead be provided across the entire front surface 11a of the substrate 11. According to this configuration, the number of steps for patterning the shape of the diffractive optics portion 12 can be reduced. This configuration also enables mass production, by employing a method in which a plurality of diffractive optics elements 5 are formed on a large substrate and cut through dicing.

Third Variation

In addition to the projector 100 as described above, various types of electronic devices can be used as the electronic device in which the diffractive optics element 5 is provided, such as a heads-up display, a smartphone, an electrical viewfinder (EVF), a mobile mini-projector, a mobile telephone, a laptop computer, a digital camera, a digital video camera, a display, a car-mounted device, an audio device, an exposure device, an illumination device, and so on.

What is claimed is:

1. A diffractive optics element comprising:
   a transparent substrate configured of an inorganic material; and
   a diffractive optics portion disposed on one surface of the transparent substrate,
   wherein
      the diffractive optics portion includes a diffractive optics layer and a base material that is disposed between the diffractive optics layer and the transparent substrate;
      the base material has a thickness of no greater than 20 μm in a direction perpendicular to the one surface of the transparent substrate;
      the diffractive optics layer and the base material are both configured of a same material that takes a siloxane bond as its skeleton; and
      the diffractive optics layer has a surface relief structure.

2. The diffractive optics element according to claim 1, wherein the base material makes contact with the diffractive optics layer.

3. The diffractive optics element according to claim 1, wherein the one surface of the transparent substrate includes a first side and a second side that is a side opposite to the first side; and
   the transparent substrate includes a portion between the first side and the second side where the diffractive optics portion is not disposed.

4. The diffractive optics element according to claim 1, wherein the transparent substrate is a sapphire substrate.

5. The diffractive optics element according to claim 1, wherein a silane coupling agent layer is provided between the transparent substrate and the diffractive optics portion.

6. An electronic device comprising:
   the diffractive optics element according to claim 1; and
   an illumination optical system including a laser light source.

7. An electronic device comprising:
   the diffractive optics element according to claim 2; and
   an illumination optical system including a laser light source.

8. An electronic device comprising:
   the diffractive optics element according to claim 3; and
   an illumination optical system including a laser light source.

9. An electronic device comprising:
   the diffractive optics element according to claim 4; and
   an illumination optical system including a laser light source.

10. An electronic device comprising:
    the diffractive optics element according to claim 5; and
    an illumination optical system including a laser light source.

11. The diffractive optics element according to claim 1, wherein the surface relief structure protrudes from the base material on a side of the base material opposite the transparent substrate.

12. The diffractive optics element according to claim 1, wherein
    a thickness of the transparent substrate is thicker than a thickness of the base material, and
    a thermal conductivity of the transparent substrate is higher than a thermal conductivity of the base material.

13. The diffractive optics element according to claim 1, wherein the surface relief structure of the diffractive optics layer has a stepped shape including a plurality of steps.

14. The diffractive optics element according to claim 1, wherein the surface relief structure of the diffractive optics layer has at least three different thicknesses in the direction perpendicular to the one surface of the transparent substrate.

* * * * *